United States Patent [19]

Sondermann

[11] Patent Number: 5,653,359
[45] Date of Patent: Aug. 5, 1997

[54] SPRINGFORM WITH COVERING HOOD

[75] Inventor: Karl Ferdinand Sondermann, Elz, Germany

[73] Assignee: W. F. Kaiser U. Co. GmbH, Germany

[21] Appl. No.: 386,821

[22] Filed: Feb. 10, 1995

[30] Foreign Application Priority Data

Feb. 18, 1994 [DE] Germany ............... 9402646 U

[51] Int. Cl.$^6$ .................................. A47J 37/01
[52] U.S. Cl. ................... 220/625; 220/323; 220/324; 220/912
[58] Field of Search ..................... 220/625, 912, 220/322, 324, 323

[56] References Cited

U.S. PATENT DOCUMENTS

| | | | |
|---|---|---|---|
| 1,727,257 | 9/1929 | Stratton et al. | 220/625 X |
| 1,862,560 | 6/1932 | Willcutt et al. | 220/323 X |
| 2,501,572 | 3/1950 | Marquez | 220/912 X |
| 2,805,788 | 9/1957 | Allbright et al. | 220/324 |
| 3,746,205 | 7/1973 | Helguera | 220/323 X |

*Primary Examiner*—Steven M. Pollard
*Attorney, Agent, or Firm*—Vickers, Daniels & Young

[57] ABSTRACT

The invention relates to a springform with a form rim which surrounds the form bottom and is provided with a clamping closure, and with a covering hood which can be mounted on the form bottom which is designed as a serving plate. According to the invention, a carrying handle is provided, which overlaps the covering hood and fixes the covering hood on the form bottom and which is connected detachable to the circumferential edge of the form bottom.

48 Claims, 2 Drawing Sheets

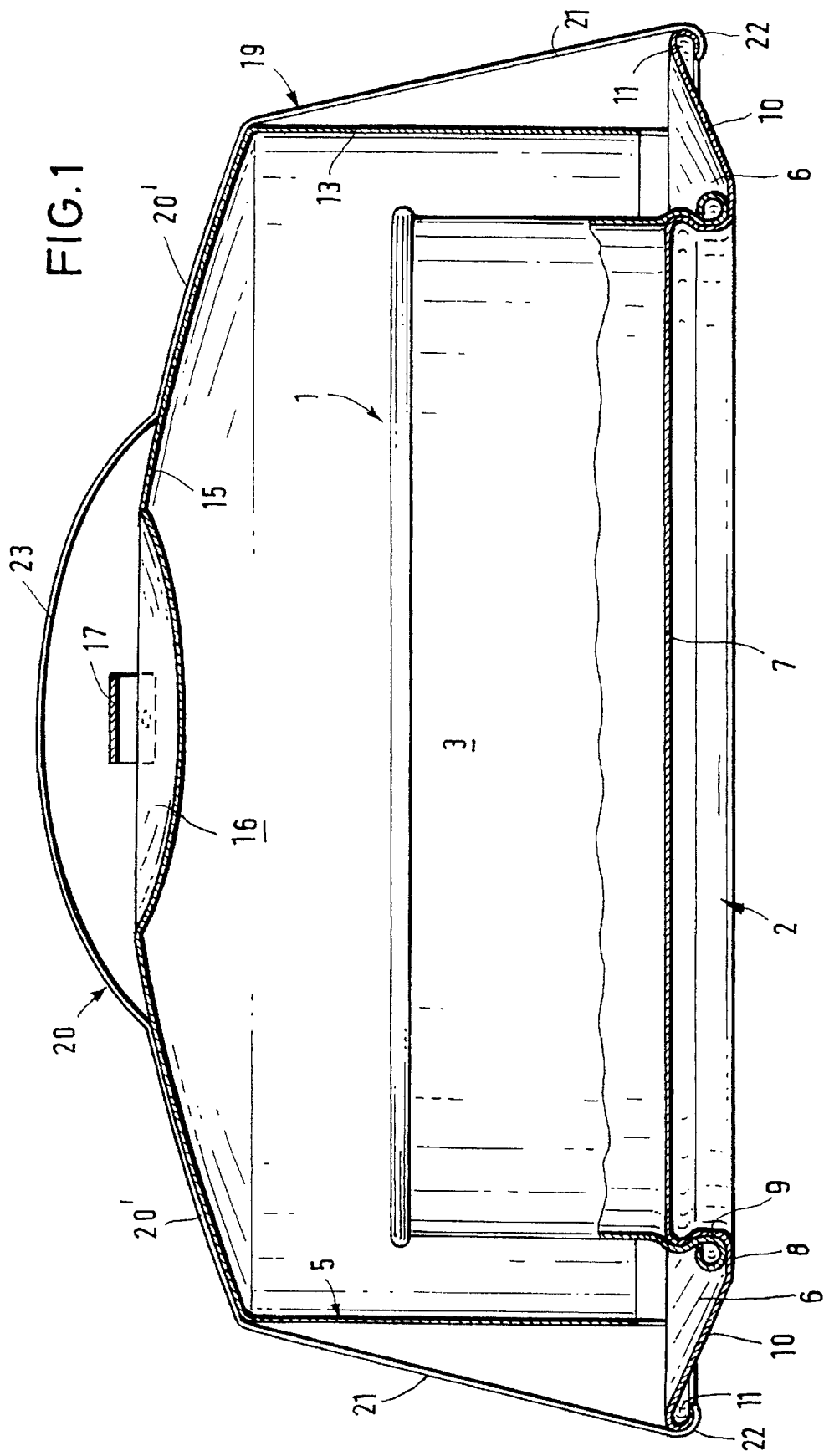

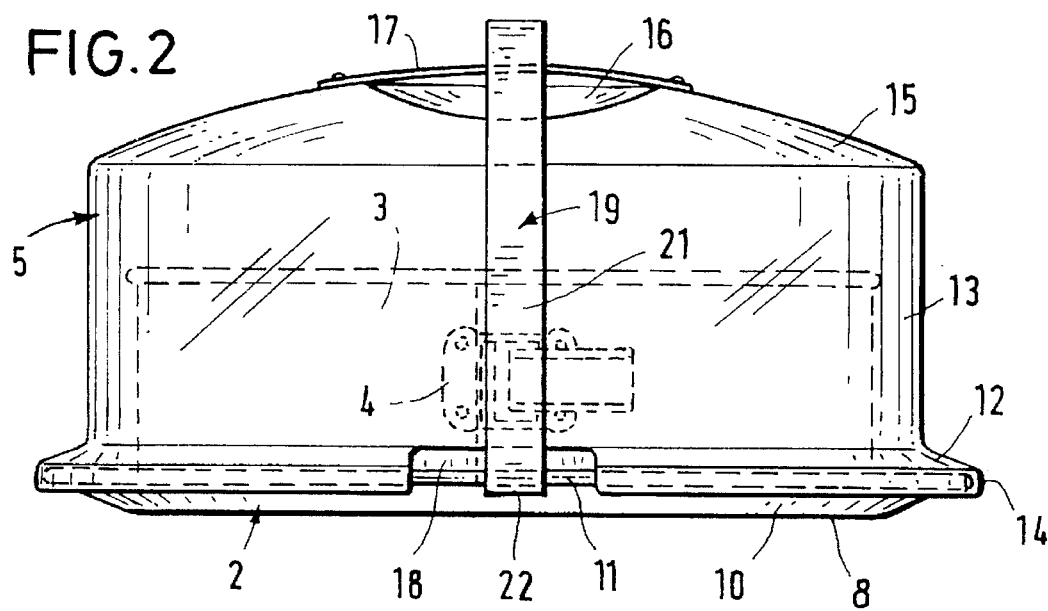
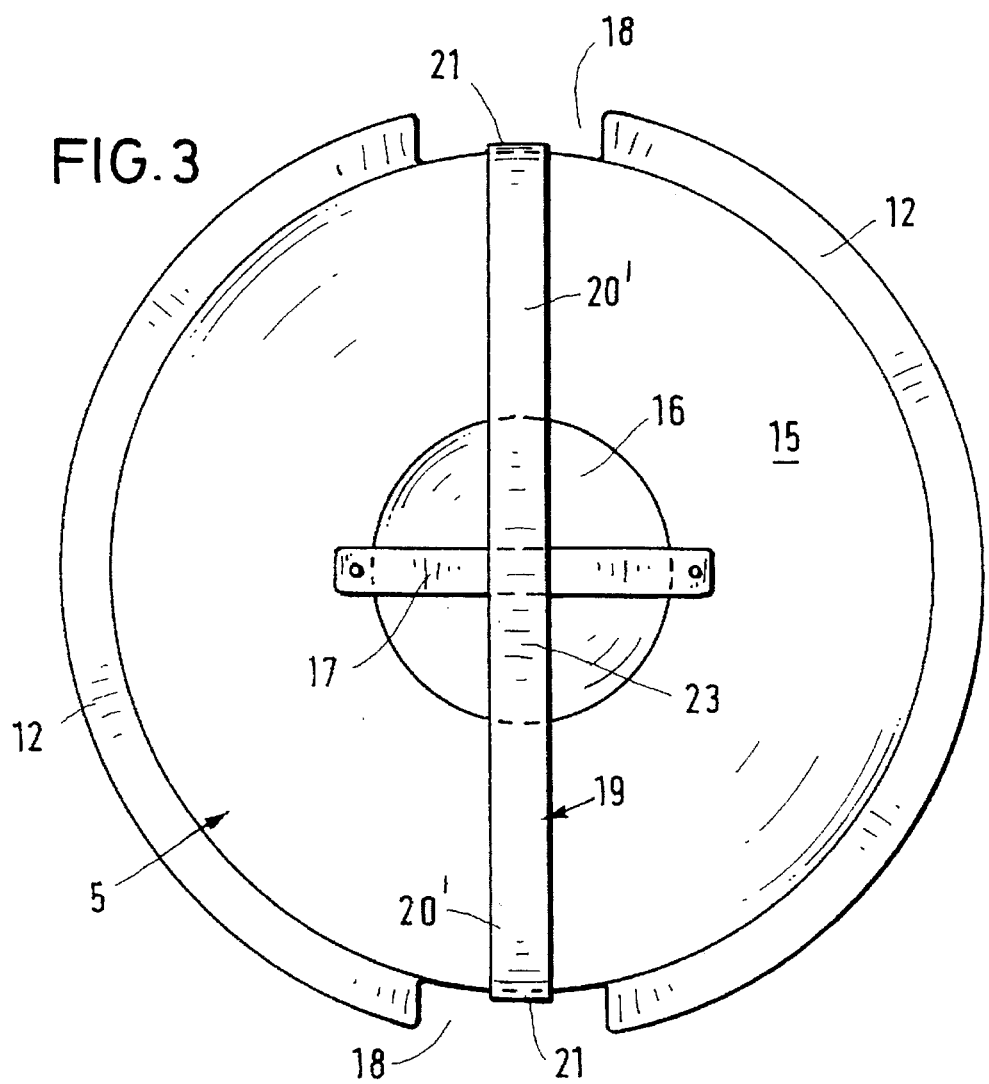

SPRINGFORM WITH COVERING HOOD

The invention relates to a springform with a clampable form rim arranged detachably on the form bottom and provided with a clamping closure, and with a covering hood which can be mounted on the form bottom.

The invention is, in particular, directed towards a springform in the embodiment according to DE-GM 93 13 693.5, in which the form bottom is designed in the manner of a serving plate with a circumferential groove, on the annular external shoulder of which the covering hood can be mounted. The covering hood, which is put over the form bottom, protects the finished baked material against external impairment and keeps it in a state capable of being enjoyed for a longer time. On the other hand, the covering hood is, however, designed in such a manner in adaptation to the springform that it can be mounted on the form bottom before or after the baking process even when the mass or material to be baked is put into the form, the form is thus clamped around the bottom part of the form bottom and the springform is consequently closed. Protection of the baked material in particular against premature evaporation can thus also be achieved. Certain baked material, in particular that which is consumed hot, can also be kept hot longer with the aid of the mounted covering hood. The mounted covering hood can also serve to protect the empty and cleaned and put-away springform against dirtying or dust deposits.

The aim of the invention is, with simple means, to combine said springform and the associated covering hood to form an easy-to-handle unit, which offers advantages in particular with regard to the presentation of goods in salerooms and/or with regard to the use of the springform on the part of the purchaser and user, and above all opens up the possibility of using the springform with the covering hood as a transport container for the finished cake.

This aim is achieved according to the invention by a carrying handle which overlaps the covering hood placed on the form bottom and secures it on the form bottom and which is or can be connected detachably to the circumferential edge of the form bottom.

The carrying handle spanning the covering hood and connected to the form bottom connects the springform and the covering hood to form a sales or use or transport unit which, if required, can be picked up and carried by the carrying handle or else, for example, hung on a sales stand. On the part of the user of the springform, the carrying handle can also be used in order reliably to fix the covering hood, which protects the material to be consumed situated on the form bottom, to the form bottom, the utensil unit consisting of the form bottom and the covering hood also being easy to handle with the aid of the carrying handle. The material to be consumed situated on the form bottom may be the baked material, which is possibly still hot and also perhaps already removed from the form, or another material to be consumed, which is put down on the form bottom when it is used as a serving plate. In particular, the springform with the covering hood fixed by the carrying handle can be used as a transport container for the safe transport of the finished cake.

The carrying handle provided according to the invention is preferably designed in the manner of a resilient clamping handle or the like, with the aid of which the covering hood can be fixed securely on the form bottom, pressing its seat surface against the circumference thereof. The carrying handle can consist of a simple additional part which is cheap to manufacture. Advantageously, it is formed from a one-piece flat band, for example a narrow and thin steel band. Furthermore, the arrangement is expediently made in such a manner that the carrying handle has, between its sections resting on the top surface of the covering hood, a grip part which is preferably of an upwardly convex shape. The approximately U-shaped carrying handle, which overlaps the covering hood with its U-web which serves as the grip part, advantageously has obliquely outwardly and downwardly directed resilient connection legs which in each case at their free end are formed into an inwardly curved hook bead or the like, with which the carrying handle can be connected to the circumferential bead of the form rim by simple hook connection.

As mentioned, the carrying handle according to the invention is preferably intended in the case of a springform with covering hood in the embodiment according to DE-GM 93 13 693.5. The form bottom designed as a serving plate has in this case a circumferential groove which surrounds in an annular manner the bottom part which is reached around by the form rim and supports the material being baked, and in which the form rim engages with its foot. In this case, the covering hood can be mounted with its foot on the external shoulder of the circumferential groove. The carrying handle has, in this case at both its ends, connections which are preferably shaped in a hook-like manner and with which it can be connected to a circumferential beading of the form bottom.

The invention is explained in greater detail below in association with the exemplary embodiment shown in the drawing. In the drawing:

FIG. 1 shows in vertical section a springform with covering hood and carrying handle according to the invention;

FIG. 2 shows the arrangement according to FIG. 1 turned through 90° and in side view, and FIG. 3 shows a top view of the covering hood and the carrying handle spanning it.

For comprehension of the invention, reference is made to DE-GM 93 13 693.5.

The springform 1 illustrated accordingly consists of the form bottom 2 and the form rim 3 which is provided with a clamping closure 4 (FIG. 2) of the usual type. The circular form bottom 2 made of sheet metal has a greater diameter than the form rim 3, likewise made of sheet metal, when the latter is fixed, with the aid of its clamping closure 4, to the form bottom. The form bottom 2 designed as a serving plate has in its circumferential region a continuous circumferential groove 6, into which the clampable form rim 3 can be introduced with its foot. The groove 6 surrounds the actual bottom part 7 of the form bottom 2 which supports the material being baked or the dough. The groove bottom 8 forms the standing surface of the springform, while the internal shoulder 9 of the circumferential groove 6 forms the annular bearing surface for the foot of the clampable form rim 3 which engages in the circumferential groove 6. The external shoulder 10 of the circumferential groove 6 is executed as an obliquely upwardly and outwardly rising inclined shoulder which has on the external circumference a downwardly directed beading 11 which forms a grip bead.

It can be seen that, when the form rim 3 is removed, the form bottom 2 can be used as a cake or gateau plate and also in a versatile manner as a serving plate. The material to be served can be protected by means of a covering hood 5 which is adapted to the springform in shape and size and which is preferably made of plastic. In FIGS. 1 and 2, the springform with its form rim 3 covered by the covering hood 5 can be seen as the covering hood 5 consists of a transparent plastic material. The covering hood 5 mounted on the form bottom 2 surrounds the bottom part 7 of the form bottom 2 at such a radial spacing that it can be mounted on the form rim 2 both when the form rim 3 is removed and when the form rim 3 is situated in the clamping position. The covering hood 5 which is mounted from above is supported with its foot on the top of the external shoulder 10 of the circumferential groove 6, in other words on the circumferential beading 11. The foot of the covering hood 5 is formed by a support collar 12 which faces obliquely outwardly in relation to the cylindrical hood body 13 and which is provided, on the external circumference, with a downwardly directed leg 14 which closely surrounds the form bottom 2 on the external circumference, in other words on the grip bead 11, as a result of which the mounted covering hood 5 is centered on the form bottom and held in an essentially shift-proof manner on the form bottom. Furthermore, the covering hood 5 has centrally on its upwardly outward-curved hood head 15 a downwardly directed trough-shaped recess 16 which is covered by a narrow grip piece 17 fastened on the hood head.

The covering hood 5 has on its foot, or on its support collar 12 forming the foot, two cutouts 18 which lie diametrically opposite in the diameter direction and in the region of the external leg 10 is outwardly exposed with its circumferential beading 11 so that the form bottom 2 can be taken hold of with both hands at the recesses 18 and carried as a serving plate.

As FIGS. 1 to 3 show, the springform 1 and the covering hood 5 can be detachably connected by means of a carrying handle 19 to form a unit or to form a receiving and transport container. The roughly approximately U-shaped carrying handle 19 overlaps with its web part 20 the covering hood 5 while, with its two obliquely outwardly and downwardly directed connection legs 21, it is connected to the circumferential edge of the form bottom 2, and in particular, according to FIGS. 2 and 3, in the region of the cutouts 18 on the foot of the covering hood. As FIG. 1 in particular shows, the free ends of the two connection legs 21 are shaped inwardly to form a hook bead 22, with which the carrying handle can be connected to the circumferential beading 11 by hooking together, as a result of which the covering hood 5 is fixed in its position on the form bottom 2. The carrying handle 19 has, between its sections 20' resting on the curved top surface 15 of the covering hood 5, a grip part 23 which overlaps the recess 16 of the covering hood and which is formed by an upwardly convex shaping of the web part 20 and can be used as a handle or as a hanging device for the springform with the covering hood.

The carrying handle 19 is preferably formed in one piece from a band material, expediently a flat band, which can be shaped to form the approximately U-shaped carrying handle, on which, therefore, the hook bead 22 and the grip part 23 are formed. An elastic plastic band can be used for the carrying handle. However, the carrying handle is preferably formed from a narrow and thin steel band. Furthermore, the carrying handle 19 can be designed in the manner of a resilient clamping handle which reaches around the covering hood with tension and is in the manner described fixed under tension on the circumference of the form bottom 2 so that pressing of the covering hood 5 against its supporting surface on the form bottom is achieved.

I claim:

1. Springform with a clampable form rim which is arranged detachable on a form bottom and is provided with a clamping closure, and with a covering hood which can be mounted on the form bottom, characterized by a carrying handle which overlaps the covering hood and secures said covering hood on the form bottom and which is connected detachably to a circumferential edge of said form bottom.

2. Springform according to claim 1, characterized in that said form bottom, which is designed as a serving plate, has a circumferential groove which surrounds in an annular manner a bottom part which is reached around by a form rim and supports the material being baked, and in which the form rim engages with a form rim foot, said covering hood having a foot and said covering hood foot being mountable on the external shoulder of said circumferential groove, and in that said carrying handle including hook-shaped ends which can be connected to a circumferential beading of said form bottom.

3. Springform according to claim 2, characterized in that said covering hood having diametrically opposite cutouts on said conveying hood foot which expose a external leg of said circumferential groove, said carrying handle being connectable to said circumferential beading of said form bottom within said opposite cutouts.

4. Springform according to claim 3, characterized in that said carrying handle including a grip part which is upwardly convex shaped.

5. Springform according to claim 4, characterized in that said carrying handle including a resilient clamping band or clamping handle.

6. Springform according to claim 5, characterized in that said carrying handle is made of a one-piece flat steel band.

7. Springform according to claim 6, characterized in that said carrying handle is substantially U-shaped and overlaps said coveting hood said carrying handle including a web part which serves as a grip part and two obliquely outwardly and downwardly directed connection legs wherein each leg has a free end which is formed into an inwardly directed hook bead.

8. Springform according to claim 5, characterized in that said carrying handle is substantially U-shaped and overlaps said covering hood said carrying handle including a web part which serves as a grip part and two obliquely outwardly and downwardly directed connection legs wherein each leg has a free end which is formed into an inwardly directed hook bead.

9. Springform according to claim 4, characterized in that said carrying handle is made of a one-piece flat steel band.

10. Springform according to claim 9, characterized in that said carrying handle is substantially U-shaped and overlaps said covering hood said carrying handle including a web part which serves as a grip part and two obliquely outwardly and downwardly directed connection legs wherein each leg has a free end which is formed into an inwardly directed hook bead.

11. Springform according to claim 4, characterized in that said carrying handle is substantially U-shaped and overlaps said covering hood said carrying handle including a web part which serves as a grip part and two obliquely outwardly and downwardly directed connection legs wherein each leg has a free end which is formed into an inwardly directed hook bead.

12. Springform according to claim 3, characterized in that said carrying handle including a resilient clamping band or clamping handle.

13. Springform according to claim 12, characterized in that said carrying handle is made of a one-piece flat steel band.

14. Springform according to claim 13, characterized in that said carrying handle is substantially U-shaped and overlaps said covering hood said carrying handle including a web part which serves as a grip part and two obliquely outwardly and downwardly directed connection legs wherein each leg has a free end which is formed into an inwardly directed hook bead.

15. Springform according to claim 12, characterized in that said carrying handle is substantially U-shaped and overlaps said coveting hood said carrying handle including a web part which serves as a grip part and two obliquely outwardly and downwardly directed connection legs wherein each leg has a free end which is formed into an inwardly directed hook bead.

16. Springform according to claim 3, characterized in that said carrying handle is made of a one-piece flat steel band.

17. Springform according to claim 16, characterized in that said carrying handle is substantially U-shaped and overlaps said covering hood said carrying handle including a web part which serves as a grip part and two obliquely outwardly and downwardly directed connection legs wherein each leg has a free end which is formed into an inwardly directed hook bead.

18. Springform according to claim 3, characterized in that said carrying handle is substantially U-shaped and overlaps said covering hood said carrying handle including a web part which serves as a grip part and two obliquely outwardly and downwardly directed connection legs wherein each leg has a free end which is formed into an inwardly directed hook bead.

19. Springform according to claim 2, characterized in that said carrying handle including a grip part which is upwardly convex shaped.

20. Springform according to claim 19, characterized in that said carrying handle including a resilient clamping band or clamping handle.

21. Springform according to claim 20, characterized in that said carrying handle is made of a one-piece flat steel band.

22. Springform according to claim 21, characterized in that said carrying handle is substantially U-shaped and overlaps said covering hood said carrying handle including a web part which serves as a grip part and two obliquely outwardly and downwardly directed connection legs wherein each leg has a free end which is formed into an inwardly directed hook bead.

23. Springform according to claim 20, characterized in that said carrying handle is substantially U-shaped and overlaps said covering hood said carrying handle including a web part which serves as a grip part and two obliquely outwardly and downwardly directed connection legs wherein each leg has a free end which is formed into an inwardly directed hook bead.

24. Springform according to claim 19, characterized in that said carrying handle is made of a one-piece flat steel band.

25. Springform according to claim 24, characterized in that said carrying handle is substantially U-shaped and overlaps said covering hood said carrying handle including a web part which serves as a grip part and two obliquely outwardly and downwardly directed connection legs wherein each leg has a free end which is formed into an inwardly directed hook bead.

26. Springform according to claim 19, characterized in that said carrying handle is substantially U-shaped and overlaps said covering hood said carrying handle including a web part which serves as a grip part and two obliquely outwardly and downwardly directed connection legs wherein each leg has a free end which is formed into an inwardly directed hook bead.

27. Springform according to claim 2, characterized in that said carrying handle including a resilient clamping band or clamping handle.

28. Springform according to claim 27, characterized in that said carrying handle is made of a one-piece flat steel band.

29. Springform according to claim 28, characterized in that said carrying handle is substantially U-shaped and overlaps said covering hood said carrying handle including a web part which serves as a grip part and two obliquely outwardly and downwardly directed connection legs wherein each leg has a free end which is formed into an inwardly directed hook bead.

30. Springform according to claim 27, characterized in that said carrying handle is substantially U-shaped and overlaps said covering hood said carrying handle including a web part which serves as a grip part and two obliquely outwardly and downwardly directed connection legs wherein each leg has a free end which is formed into an inwardly directed hook bead.

31. Springform according to claim 2, characterized in that said carrying handle is made of a one-piece flat steel band.

32. Springform according to claim 31, characterized in that said carrying handle is substantially U-shaped and overlaps said covering hood which serves as a grip part and two obliquely outwardly and downwardly directed connection legs wherein each leg has a free end which is formed into an inwardly directed hook bead.

33. Springform according to claim 2, characterized in that said carrying handle is substantially U-shaped and overlaps said coveting hood said carrying handle including a web part which serves as a grip part wherein each leg has a free end which is formed into an inwardly directed hook bead.

34. Springform according to claim 1, characterized in that said carrying handle including a grip part which is upwardly convex shaped.

35. Springform according to claim 34, characterized in that said carrying handle including a resilient clamping band or clamping handle.

36. Springform according to claim 35, characterized in that said carrying handle is made of a one-piece flat steel band.

37. Springform according to claim 36, characterized in that said carrying handle is substantially U-shaped and overlaps said covering hood said carrying handle including a web part which serves as a grip part and two obliquely outwardly and downwardly directed connection legs wherein each leg has a free end which is formed into an inwardly directed hook bead.

38. Springform according to claim 35, characterized in that said carrying handle is substantially U-shaped and overlaps said covering hood said carrying handle including a web part which serves as a grip part and two obliquely outwardly and downwardly directed connection legs wherein each leg has a free end which is formed into an inwardly directed hook bead.

39. Springform according to claim 34, characterized in that said carrying handle is made of a one-piece flat steel band.

40. Springform according to claim 39, characterized in that said carrying handle is substantially U-shaped and overlaps said covering hood said carrying handle including a web part which serves as a grip part and two obliquely outwardly and downwardly directed connection legs wherein each leg has a free end which is formed into an inwardly directed hook bead.

41. Springform according to claim 34, characterized in that said carrying handle is substantially U-shaped and overlaps said covering hood said carrying handle including a web part which serves as a grip part and two obliquely outwardly and downwardly directed connection legs wherein each leg has a free end which is formed into an inwardly directed hook bead.

42. Springform according to claim 1, characterized in that said carrying handle including a resilient clamping band or clamping handle.

43. Springform according to claim 42, characterized in that said carrying handle is made of a one-piece flat steel band.

44. Springform according to claim 43, characterized in that said carrying handle is substantially U-shaped and overlaps said covering hood said carrying handle including a web part which serves as a grip part and two obliquely outwardly and downwardly directed connection legs wherein each leg has a free end which is formed into an inwardly directed hook bead.

45. Springform according to claim 42, characterized in that said carrying handle is substantially U-shaped and overlaps said covering hood said carrying handle including a web part which serves.

46. Springform according to claim 1, characterized in that said carrying handle is made of a one-piece flat steel band.

47. Springform according to claim 46, characterized in that said carrying handle is substantially U-shaped and overlaps said covering hood said carrying handle including a web part which serves as a grip part and two obliquely outwardly and downwardly directed connection legs wherein each leg has a free end which is formed into an inwardly directed hook bead.

48. Springform according to claim 1, characterized in that said carrying handle is substantially U-shaped and overlaps said covering hood said carrying handle including a web part which serves as a grip part and two obliquely outwardly and downwardly directed connection legs wherein each leg has a free end which is formed into an inwardly directed hook bead.

* * * * *